United States Patent
Reid

Patent Number: 5,277,348
Date of Patent: Jan. 11, 1994

[54] ARTICULATED PARACHUTE HARNESS

[76] Inventor: Sandy R. Reid, 40455 Royal Cir., Hemet, Calif. 92544

[21] Appl. No.: 892,205

[22] Filed: Jun. 2, 1992

[51] Int. Cl.⁵ .................................. B64D 17/30
[52] U.S. Cl. ................................ 244/151 R; 182/6
[58] Field of Search ..................... 244/151; 182/6

[56] References Cited

U.S. PATENT DOCUMENTS

| | | | |
|---|---|---|---|
| 1,403,984 | 1/1922 | Smith | 244/151 R |
| 2,108,716 | 2/1938 | Kuhlemann | 244/151 R |
| 2,302,947 | 11/1942 | Kohler | 54/1 |
| 2,431,358 | 11/1947 | Wilson | 244/151 A |
| 2,439,613 | 4/1948 | Quilter | 244/151 A |
| 2,519,352 | 8/1950 | Carroll | 244/151 A |
| 2,726,832 | 12/1955 | Gimalouski | 244/151 A |
| 2,979,028 | 4/1961 | Zakely | 119/96 |
| 2,989,274 | 6/1961 | Moran | 144/151 R |
| 3,154,272 | 10/1964 | Gold | 244/151 R |
| 3,258,231 | 6/1966 | Basnett | 244/151 R |
| 3,692,262 | 9/1972 | Gaylord | 244/151 R |
| 3,692,263 | 9/1972 | Pravaz | 244/151 R |
| 3,757,744 | 9/1973 | Pravaz | 244/151 R |
| 3,765,627 | 10/1973 | Snyder | 244/151 A |
| 3,767,143 | 10/1973 | Gaylord | 244/151 A |
| 4,090,683 | 5/1978 | Derrien et al. | 244/151 R |
| 4,720,064 | 1/1988 | Herndon | 244/151 R |
| 4,738,413 | 4/1988 | Spinosa et al. | 244/151 R |
| 4,850,554 | 7/1989 | Strong | 244/151 R |
| 4,898,346 | 2/1990 | Ertler | 244/148 |
| 4,923,149 | 5/1990 | Feher | 244/151 R |
| 4,938,436 | 7/1990 | Bradley et al. | 244/151 R |
| 5,080,191 | 1/1992 | Sanchez | 244/151 R |

FOREIGN PATENT DOCUMENTS

| | | | |
|---|---|---|---|
| 127995 | 5/1945 | Australia | 244/151 R |
| 894898 | 1/1945 | France | 244/151 R |
| 1058373 | 3/1954 | France | 244/151 R |

Primary Examiner—Michael S. Huppert
Assistant Examiner—Anne E. Bidwell
Attorney, Agent, or Firm—Fulwider, Patton, Lee & Utecht

[57] ABSTRACT

Parachute harness including laterally spaced apart right and left main lift web and leg strap devices, a parachute container disposed therebetween and connected on the top by shoulder straps and on the bottom by articulating rings which also serve to connect the bottom of the main lift web with the opposite ends of respective leg straps.

7 Claims, 3 Drawing Sheets

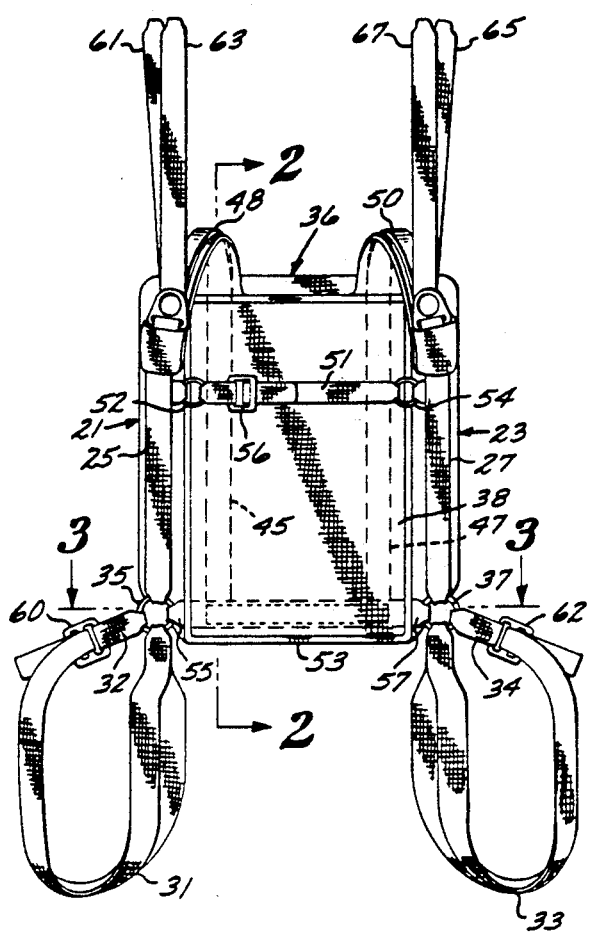
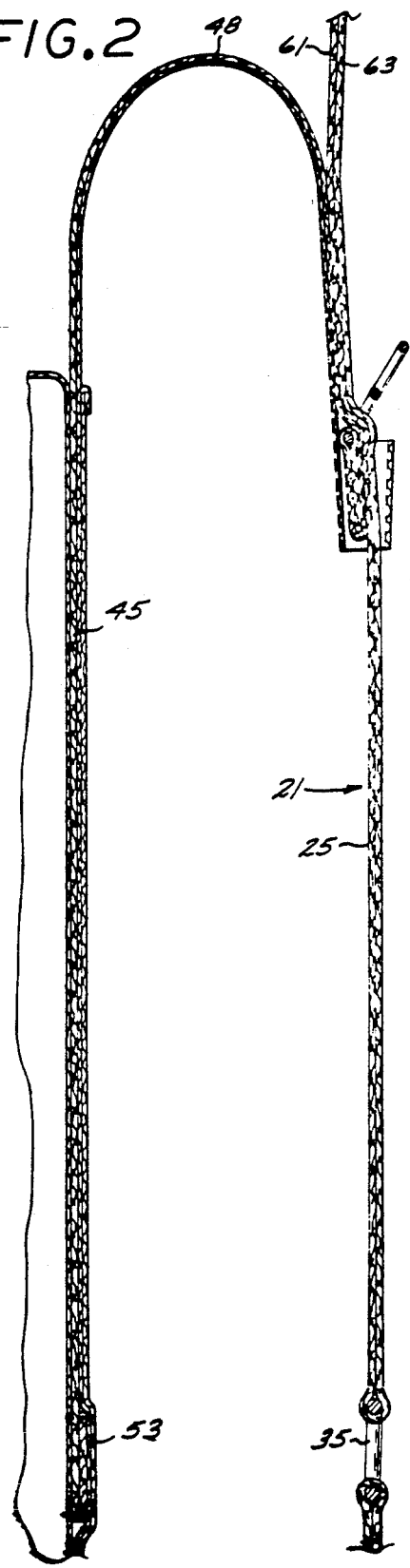
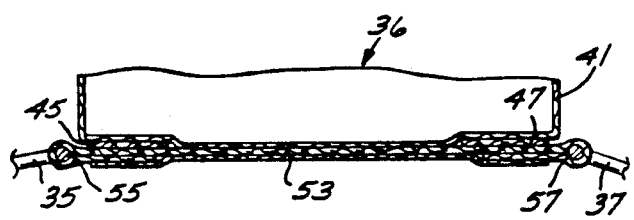

FIG. 8
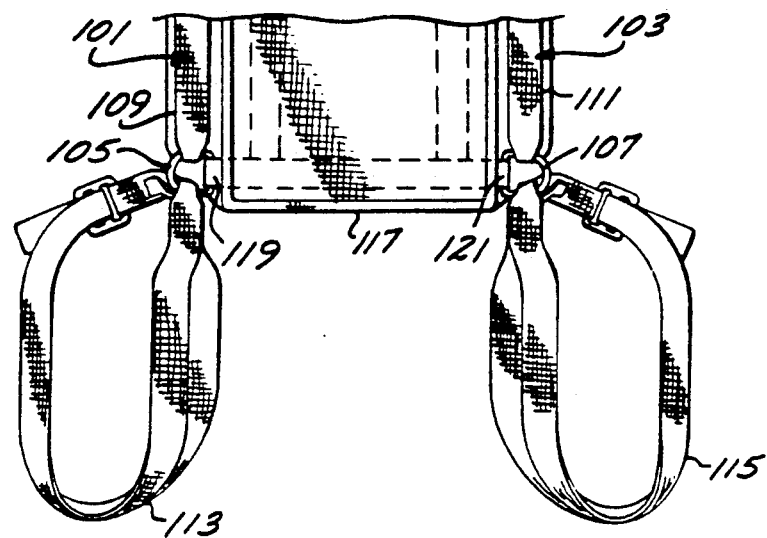
FIG. 9
FIG. 10
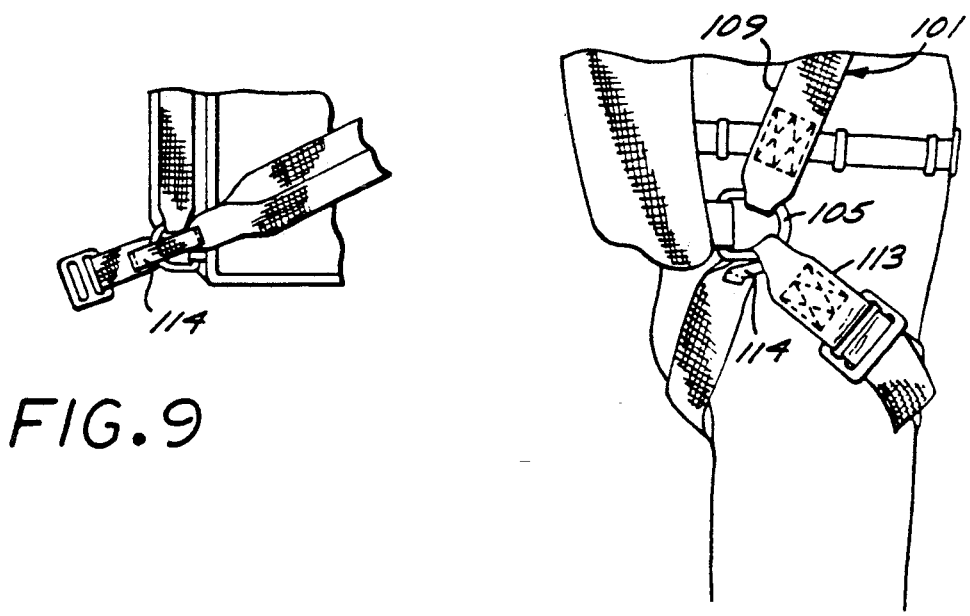

ARTICULATED PARACHUTE HARNESS

BACKGROUND OF THE INVENTION

1. Field of the Invention

This invention relates generally to sky diving parachutes and more particularly has reference to a parachute harness which provides relatively free movement for the jumper, both before and during the jump.

2. Description of the Prior Art

One of the major drawbacks to sky diving is the restriction placed on a jumper's movements by the parachute harness itself. Once the jumper puts on the harness, his body movements are severely limited in degree and range. The result is that what were once simple movements now become long, drawn out and strenuous activities because of the restricting nature of most parachute harnesses. In fact, such restricting harnesses tax the endurance of the jumper even before he has made his jump.

In a sport such as sky diving, safety of the jumper during the jump is of tantamount importance. From a physical standpoint, a diver who is fatigued before the dive is more likely to make errors in preparing for the dive because of the distraction that a taxing harness presents. More importantly, from a mental standpoint, fatigue arising from challenging physical tasks undertaken in pre-jump activity can dull the jumper's alertness during the dive and make him or her more prone to mistakes.

Parachute harnesses employed in skydiving activity serve first to mount a container for storing the folded canopy and second to, when the canopy is deployed, suspend the jumper. Such harnesses are typically constructed of webbing material joined together by stitching. For instance, a harness may incorporate laterally spaced apart shoulder and leg straps joined together and connected with the lower portion of a parachute container by means of laterally projecting webbing tabs. The juncture point is thus typically constructed of a plurality of sandwiched together layers of webbing which, when stitched, cause the harness components to present considerable resistance to the wearer's body movements. Thus, such simple movements and raising of the jumper's leg to step up into the passenger compartment of an airplane may be resisted by the relative inflexibility of the leg strap relative to the parachute container and/or chest strap.

With the current popularity of skydiving as a recreational sport, the transport of multiple jumpers in a single airplane from an air field to a jumping altitude has become a fairly common recreational endeavor. There is a certain economic motivation to provide for relatively rapid loading and take off of the airplane so as to minimize the time the aircraft is in use for each jump. In this regard, there is great benefit to expeditious loading of the aircraft and seating of the jumpers for take off. This process may involve a group of 15 or more jumpers approaching the aircraft and entering through a side entry door or opening. In the process, the jumpers are required to follow a certain procedure which may involve stepping up into the aircraft and moving to a bench or seat area to be seated, sometimes in close proximity to one another. Thus, freedom of movement is important.

Moreover, repeated jumps in close sequence results in repeated abrupt application of forces through the harness to the jumper's body thus requiring a harness construction which will apply those suspension forces to the jumper's body without undue discomfort.

In the past, parachute harnesses utilized in skydiving have typically exhibited a resistance tending to hinder movement of the jumper both during his or her ground activity and sometimes even while moving about in the aircraft to perform the jump itself.

An impressive array of harness devices have been proposed in the past which incorporate various buckling and connector arrangements intended for quick release or to facilitate convenient adjustment of the harness to the sizes of jumpers having different stature or girth dimensions. Examples of some of these prior devices appear in different U.S. patents. For instance, a quick release parachute harness has been proposed which includes leg straps connected by means of oppositely disposed straps tethered on one end to a waist band, the opposite extremities of which define shoulder straps. A device of this type is shown in U.S. Pat. No. 2,431,358 to Wilson. While satisfactory for the quick release feature intended by Wilson, such devices fail to provide for convenient and secure mounting of a parachute canopy container to the harness itself in such a manner as to provide for relatively unrestricted movement of the jumper while, at the same time, providing for comfortable distribution of carrying forces upon deployment of the canopy.

Another example of a quick release harness is a harness incorporating oppositely disposed chest straps which thread at their lower extremities freely through connector rings mounted on the corners of a somewhat triangular shaped crotch support to then bifurcate and fan out into a waist band and leg strap. A device of this type is shown in U.S. Pat. No. 3,692,263 to Pravaz. Harnesses of this type have not gained general popularity in the sky diving field due, in part, to the complicated construction thereof and to the fact that they fail to employ a practical and reliable arrangement for mount of the parachute container and a configuration for the harness connector to afford free movement for the jumper.

Examples of rapidly adjustable and quickly releasable harnesses are general use harnesses of the type including a sling-like seat having forwardly projecting straps terminating in free ends having rings carried therefrom for threading therethrough of what might be termed combination chest, waist and shoulder straps. A device of this type is shown in U.S. Pat. No. 3,757,744 to Pravaz. While incorporating features which might allow for quick release, such a device is not generally acceptable for skydiving activity since there is no practical arrangement for mounting the parachute container or for comfortable distribution of forces upon canopy deployment.

Other body harnesses have been proposed for suspending victims from a helicopter or the like. One such harness incorporates a main vertical chest strap carrying a ring at the bottom end for connection with snaps employed on the ends of leg straps. A device of this is shown in U.S. Pat. No. 2,979,028 to Zakely. Suspension of a skydiving jumper from a chest strap of this type would have no practical application in the everyday practice of the sport.

Thus, there exists a need for equipment which provides the jumper with comfort and maneuverability during pre-jump and jumping activity while loading in a balanced and comfortable manner upon deployment of the canopy.

SUMMARY OF THE INVENTION

The present invention overcomes the problems which exist in the prior art by providing a parachute harness with increased flexibility to allow the jumper to prepare for, execute, and conclude his diving with enhanced efficiency and comfort.

The parachute harness of the present invention is characterized by a pair of laterally spaced apart right and left strap devices including respective upper main lift webs and lower leg straps. A parachute container is mounted between the respective strap devices and articulated rings connect the lower opposite sides of such container with the strap devices to thus provide free articulation of the leg straps relative to the container and, preferably, the main lift webs. In alternative embodiments the rings serve as the juncture point between the main lift webs, leg straps and as a connector to the parachute container.

These and other and further objectives and features of the invention are apparent in the disclosure which include the above and below specification and claims and drawings.

BRIEF DESCRIPTION OF THE DRAWINGS

FIG. 1 is a front elevational view of the articulating parachute harness embodying features of the present invention;

FIG. 2 is a fragmentary vertical sectional view, in enlarged scale, taken along the lines 2—2 of FIG. 1;

FIG. 3 is a horizontal sectional view, in enlarged scale, taken along the lines 3—3 of FIG. 1;

FIG. 8 is a front elevational view of a third embodiment of the parachute harness of the present invention;

FIG. 9 is a fragmentary view of the harness shown in FIG. 9; and

FIG. 10 is a fragmentary side view, in enlarged scale, of the parachute apparatus shown in FIG. 8 and carried on the back of a jumper.

DETAILED DESCRIPTION OF THE PREFERRED EMBODIMENT

Figure 4:
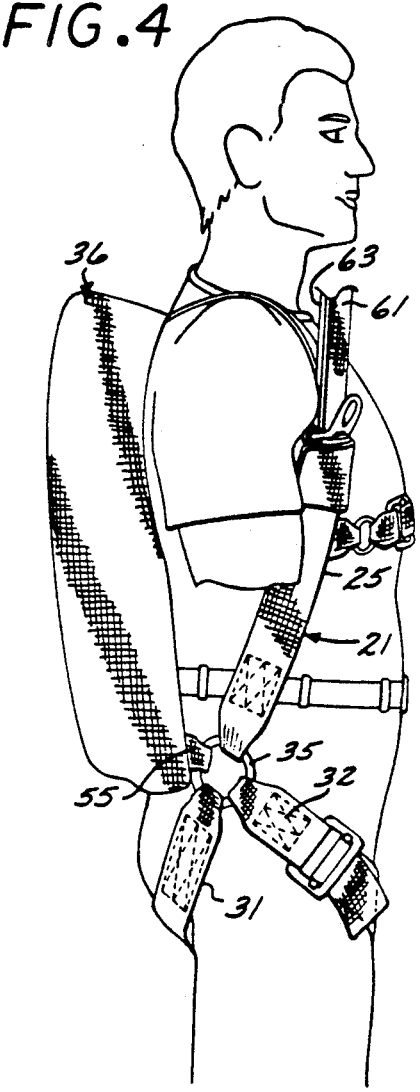
FIG. 4 is a side elevational view of the articulating parachute harness shown in FIG. 1 carried on the back of a jumper.

Referring to FIGS. 1 and 4, the skydiver's parachute harness apparatus of the present invention includes, generally, laterally spaced apart vertically upright right and left hand strap devices 21 and 23 formed in the upper extremities by respective main lift webs 25 and 27 and in the lower extremities by respective lower leg straps 31 and 33. A parachute container, generally designated 36, is carried between the strap devices 21 and 23 and has its bottom extremity connected thereto by means of respective right and left articulating rings 35 and 37 to thus leave the lower leg straps 31 and 33 free to articulate without undue restriction from the connection to such container or the main lift webs 25 and 27.

The sport of recreational skydiving often involves jumpers making multiple jumps each day. That is, a jumper may desire to make four, five or even six jumps in a single day. To accommodate this rather robust schedule, the jumper must have equipment which will not over tax his or her endurance in preparing for the jump, loading on board a jump plane to be seated therein during ascent to altitude, and which will also accommodate the jumper's movements in making a rapid deployment from the airplane and facilitate freedom of movement during the free fall stage. Then, when the canopy is opened, the parachute harness must accommodate the relatively abrupt application restraining forces to the jumper with some degree of comfort.

The harness shown in FIG. 1 is oriented so that the viewer is facing the front wall 38 of the container 36. The container 36 is formed by a cloth envelope defining such wall 38 and side walls 41 (FIG. 3). Vertical back straps 45 and 47 are mounted to the back side of the container and are sandwiched at their bottom ends in position beneath the ends of a horizontal back strap 53 to thus provide structural support for such container. With continued reference to FIG. 1, the opposite extremities of such horizontal back strap 53 are threaded through the respective connector rings 35 and 37 and turned back on themselves to be stitched and form the connections defined by the horizontal back strap extremities 55 and 57.

Referring to FIGS. 1 and 2, the respective vertical back straps 45 and 47 extend upwardly and turn forwardly over the shoulders to form shoulder straps 48 and 50 which join with the respective main lift webs 25 and 27 to secure the top of the container to such main lift webs.

The main lift webs 25 and 27 are formed of double length to wrap intermediately around the respective connector rings 35 and 37 as shown in FIG. 2 to thereby form a double thickness and a secure load carrying connection to such rings. The lower leg straps 31 and 33 are likewise turned back on themselves to be connected on their respective opposite ends to the connecting rings 35 and 37 and include the usual adjustment buckles 60 and 62 (FIG. 1).

Referring to FIGS. 1 and 2, the opposite runs of the right and left main lift webs project upwardly to form respective right and left front and rear risers 61 and 63 and 65 and 67 which connect with the canopy shrouds.

Connected between the main lift webs 25 and 27 is a front chest strap 51 connected at its opposite sides to connector rings 52 and 54 and connected medially by a buckle 56.

In operation, the jumper may don the harness by placing the shoulder straps over his shoulders and positioning the parachute pack 36 on his back to locate the main lift webs 25 and 27 on his chest. The respective lower leg straps 31 and 33 may then be wrapped around the medial sides of the jumper's legs and connected at the respective buckles 60 and 62 to thereby establish the desired adjustment for comfort dictated by the stature of the particular jumper. In this configuration, the main lift webs 25 and 27 establish a relatively straight load line from a location just forward of the jumper's shoulder, extending downwardly and laterally to the respective points defined by the respective rings 35 and 37 lateral of the hip. The rearward runs of the lower leg straps 31 and 33 then continue laterally downwardly in an extended straight line to turn inwardly behind the jumper's buttocks and then turn forwardly to pass medially through the legs to the front side thereof to again connect on their respective medial end to the respective rings 35 and 37.

Figure 5:
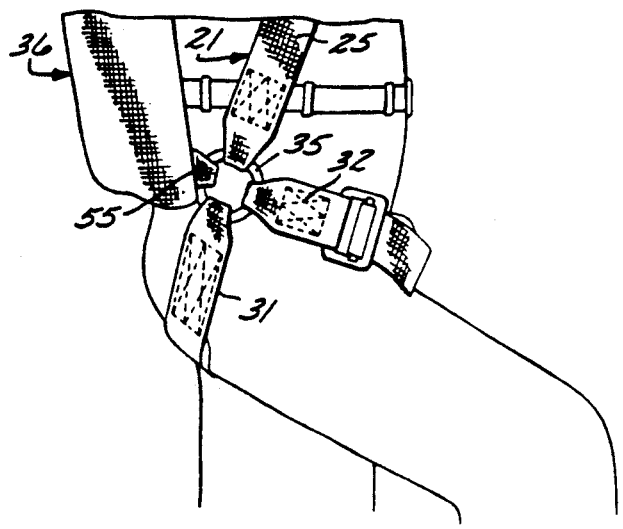
FIG. 5 is a fragmentary view of the harness shown in FIG. 4.
Figure 6:
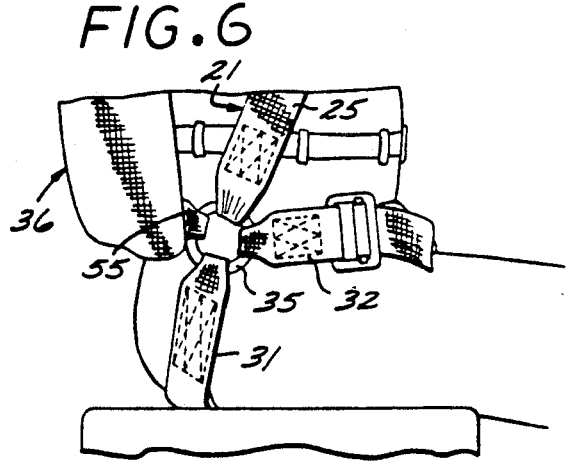
FIG. 6 is a fragmentary view of FIG. 4 showing the jumper in a seated position.

Applicant has discovered that, with the construction shown and described, the jumper can move about relatively free of restraint by the harness itself. For instance, the ends of the right main lift webs 25, lower leg strap 31 and upper leg strap 32, as well as the horizontal back strap 55 being connected to the ring 35 to allow for free movement thereabout (FIG. 5), allow for free articulation to thus leave the jumper's leg free of restriction for upward movement of the knee as shown, as for instance during stepping up into the airplane intended to transport the jumper to the jumping altitude. In fact, the upper leg strap 32 is free to move freely on the periphery of such ring from the position generally 45° below the horizontal as dictated by the standing position of the jumper (FIG. 4) to a horizontal disposition (FIG. 6) as dictated by the seated position of the jumper. Consequently, the comfort of the jumper is enhanced during pre-flight activity and during the boarding procedure and transport to the jumping altitude. This then minimizes the exertion of energy leaving the jumper relatively refreshed for the jump or jumps to be made during the particular outing. Such freedom of movement for the leg strap relative to both the container 36 and main lift web 25 also serves to minimize injury to body parts such as from rubbing and chafing of belts and webbing. The above-mentioned discovery equally applies to the left side of the harness as embodied by left main lift web 27, lower leg strap 33, upper leg strap 34 and horizontal back strap 57.

When the transport plane reaches altitude, the movement of the jumper as he rises from the seated position is relatively unrestricted and relative freedom of movement is experienced as he exits the airplane. There is a little sense of restriction on movement exerted by the harness during free fall. Then, when the parachute canopy is deployed from the container, there will be a somewhat abrupt deceleration of the jumper's rate of descent. The resultant forces applied to the lower leg straps 31 and 33 will be reacted from defined points defined by the juncture of such leg straps with the respective rings 35 and 37 to then act along relatively straight lines, upwardly through the main lift webs to the respective risers 61, 63, 65 and 67. This action then serves to distribute the rather abruptly applied load in a comfortable and balanced manner.

Figure 7:
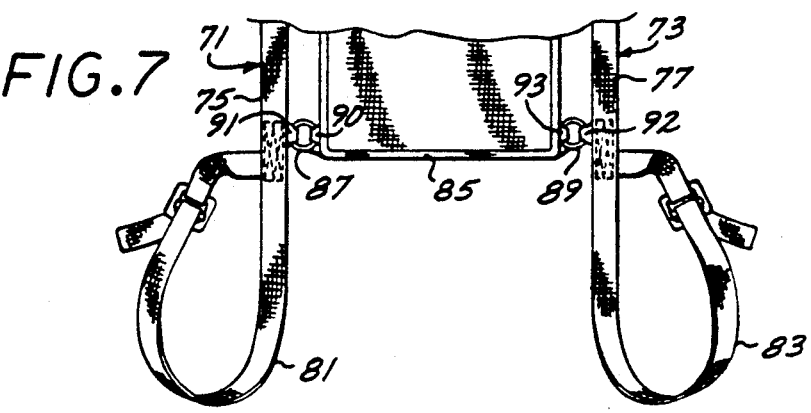
FIG. 7 is a front elevational view of a second embodiment of the parachute harness of the present invention.

The embodiment of the parachute harness shown in FIG. 7 is similar to that for the harness shown in FIGS. 1 and 4 except that it includes right and left strap devices, generally designated 71 and 73, in which the respective main lift webs 75 and 77 are formed integrally with the respective leg straps 81 and 83. The opposite sides of the bottom of the container, generally designated 85, are connected by means of tabs 90 and 93 to one side of right and left coupling rings 87 and 89. The opposite sides of such rings are then connected to the respective strap devices 71 and 73 by means of attachment tabs 91 and 92.

Thus, operation of the harness shown in FIG. 7 is similar to that for that of the harness shown in FIGS. 1 and 4 except that the main articulation feature is achieved by the free movement of the main lift web and leg straps 75, 77, 81 and 83 relative to the back pack 85 due to the free articulation about the periphery of the respective coupling rings 87 and 89.

For instance, when the jumper wearing the harness raises his or her right leg, as to step up into an aircraft, the right leg strap 81 is free to raise relative to the container 85 and main lift web 75. With free articulation of the ring 87 relative to the tab 90 and of the tab 91 relative to such ring there is little structural rigidity which could restrain movement. Thus, the lower end of main lift web 75 is free to move some distance bodily forward relative to the container 85 and the strap itself is free to bend to freely permit the lateral and medial runs of the leg strap 81 to raise with the jumper's thigh.

In general, it will be appreciated by those skilled in the art that the articulating connector may be constructed in any one of a number of configurations, including rigid circular or polygonal shape or may even be constructed of flexible fabric such as a loop formed from a strip of endless webbing. It will be further appreciated that the only effect resulting from the substitution of fabric loops for the rigid metal rings is the sacrifice in some degree of ruggedness, appearance and the maintenance of the desired orientation for the various straps.

Turning now to another embodiment incorporating a multi-sided rigid construction, attention is invited to FIGS. 8-10. The harness shown therein is also similar in construction to that for the harness shown in FIGS. 1 and 4, except that the right and left harness devices, generally designated 101 and 103, include respective D-shaped coupling rings 105 and 107 formed with respective straight vertical sides, straight top and bottom runs connected together by the curved front side. The bottom ends of the main lift webs 109 and 111 are folded back around the respective top sides of such rings and the intermediate length of the respective leg straps 113 and 115 are threaded over the respective bottom sides thereof to provide the free articulation feature. The straight back sides of the respective D-rings 105 and 107 are connected to the opposite ends of the horizontal back strap 117 by means of the respective folded back right and left hand tabs 119 and 121 which serve to maintain such rings with the curved portion facing forwardly.

Small retainer straps 114 (FIG. 10) are attached at their opposite ends to the underside of such leg straps 113 and 115 to hold them captive on the respective rings 105 and 107.

Again, operation is similar to that for the harness shown in FIGS. 1-4 but with the benefit that the D-rings 105 and 107 essentially define vertical hinge axes about the straight sides thereof and horizontal hinge axes about the side runs thereof for the main lift webs 101 and 111 and leg straps 113 and 115.

From the foregoing it will be apparent that the parachute harness of the present invention provides a relatively sturdy construction while providing for relative freedom of movement for the jumping during his or her pre-flight or in-flight activity.

What is claimed is:

1. Articulated parachute harness apparatus for supporting a jumper from a pair of right and left risers descending from a parachute canopy and comprising;
   a parachute container for support on said jumper's back;
   a pair of rigid articulation rings disposed adjacent the respective right and left hips of said jumper;
   respective container connectors connecting the respective said rings to the opposite sides of said parachute container;
   a pair of right and left main lift webs descending downwardly from the respective said right and left risers and formed with bottom extremities wrapping around the respective said right and left said articulation rings for sliding thereabout;

respective right and left leg straps for wrapping around the legs of said jumper and wrapped at the opposite extremities thereof about the respective said right and left articulation rings for sliding thereabout whereby said articulation rings will provide for free sliding of said main lift webs and leg straps on the respective said rings to provide for free articulation of said webs and straps relative to said articulation rings.

2. Articulated parachute harness apparatus as set forth in claim 1 wherein:

said right and left leg straps are formed with lateral ends terminating at, and connected to, the respective articulation rings in opposed relationship to the respective said bottom extremities of said webs.

3. Articulated parachute harness apparatus as set forth in claim 2 wherein:

said right and left leg straps are formed with medial lengths terminating in respective extremities wrapped about said articulation rings in opposed relationship to the respective said container connectors.

4. Articulated parachute harness apparatus as set forth in claim 1 wherein:

said right and left leg straps are formed with medial lengths terminating in respective extremities wrapped about said articulation rings in opposed relationship to the respective said container connectors.

5. Articulated parachute harness apparatus as set forth in claim 1 wherein:

said articulation rings are circular.

6. Articulated parachute harness apparatus as set forth in claim 5 wherein:

said right and left leg straps are formed with medial lengths terminating in respective extremities wrapped about said articulation rings in opposed relationship to the respective said container connectors.

7. Articulated sports parachute harness apparatus for supporting a jumper and comprising:

a parachute container;

a pair of laterally spaced apart right and left shoulder and main lift webs disposed on the opposite sides of said container and terminating in lower extremities;

rigid articulation rings connecting said lower extremities to the lower extremity of said container;

a pair of right and left leg straps formed with respective medial lengths connected on respective one ends with the respective said main webs to pass downwardly behind the respective buttocks of said jumper and forwardly on the lateral sides of the legs to form respective lateral lengths affixed at their respective lateral ends to the respective said lower extremities of said webs; and coupling buckle means in said leg straps for adjusting the respective lengths thereof whereby said shoulder webs may be placed over the shoulder of said jumper and said leg straps wrapped rearwardly behind the respective said buttocks forward onto the lateral sides of said legs and said coupling buckle means coupled so that during a jump the weight of said jumper distributed to said one ends of the respective said leg straps will be carried in a straight line from the respective said one ends of said leg straps up the respective said webs.

* * * * *